US009401635B2

(12) United States Patent
Humphrey et al.

(10) Patent No.: US 9,401,635 B2
(45) Date of Patent: Jul. 26, 2016

(54) SWITCHING POWER SUPPLY FOR A LOAD IN STANBY MODE

(75) Inventors: Daniel Humphrey, Houston, TX (US); Mohamed Amin Bemat, Cypress, TX (US); David Paul Mohr, Spring, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 386 days.

(21) Appl. No.: 13/259,542

(22) PCT Filed: Apr. 27, 2009

(86) PCT No.: PCT/US2009/041798
§ 371 (c)(1),
(2), (4) Date: Sep. 23, 2011

(87) PCT Pub. No.: WO2010/126477
PCT Pub. Date: Nov. 4, 2010

(65) Prior Publication Data
US 2012/0026763 A1 Feb. 2, 2012

(51) Int. Cl.
*H02M 7/21* (2006.01)
*H02M 1/42* (2007.01)
(Continued)

(52) U.S. Cl.
CPC .............. *H02M 1/4225* (2013.01); *H02J 9/005* (2013.01); *H02M 2001/007* (2013.01); *H02M 2001/0032* (2013.01); *Y02B 70/126* (2013.01); *Y02B 70/16* (2013.01)

(58) Field of Classification Search
CPC . H02J 1/102; H02J 9/005; H02M 2001/0045; H02M 1/4225; H02M 2001/0032; H02M 2001/007; Y02B 70/126; Y02B 70/16; G05F 1/70

USPC ................ 307/29, 31–34, 38, 45, 46, 58, 85; 363/65, 74, 78, 79; 323/205, 207, 323/266–268, 271
See application file for complete search history.

(56) References Cited

U.S. PATENT DOCUMENTS 5,179,508 A    1/1993  Lange
5,910,891 A *  6/1999  Jo ....................... H02M 1/4225
                                              323/207

(Continued)

FOREIGN PATENT DOCUMENTS

CN    1864319       11/2006
CN    101330783     12/2008

(Continued)

OTHER PUBLICATIONS

Bo-Teng Huang et al., Design of a Two-Stage AC/DC Converter with Standby Power Losses Less than 1W, Center for Power Electronics Technology, National Taipei University of Technology, pp. 1630-1635.

(Continued)

*Primary Examiner* — Jue Zhang
*Assistant Examiner* — Gustavo Rosario Benitez
(74) *Attorney, Agent, or Firm* — Hewlett Packard Enterprise Patent Department

(57) ABSTRACT

A switching power supply includes power factor correction circuitry and a standby output converter. One or more loads may be coupled to one or more outputs of the switching power supply. The switching power supply is configured to disable the power factor correction circuitry under some load conditions and to enable the power factor correction circuitry under other load conditions. As a consequence, power that would have been drawn by the power factor correction circuitry is conserved when the power factor correction circuitry is disabled.

12 Claims, 3 Drawing Sheets

(51) Int. Cl.
  *H02J 9/00* (2006.01)
  *H02M 1/00* (2006.01)

(56) References Cited

U.S. PATENT DOCUMENTS

| | | | | |
|---|---|---|---|---|
| 6,181,895 B1* | 1/2001 | Hirst | | 399/88 |
| 6,229,724 B1* | 5/2001 | Virtanen | | 363/89 |
| 6,487,098 B2 | 11/2002 | Malik | | |
| 7,092,266 B2 | 8/2006 | Frank | | |
| 7,126,647 B2* | 10/2006 | Cha | H02M 1/15 | 307/126 |
| 2003/0052653 A1* | 3/2003 | Mendenhall | H02M 1/4208 | 323/210 |
| 2003/0202368 A1* | 10/2003 | Ierymenko | H02M 1/4208 | 363/125 |
| 2005/0035661 A1* | 2/2005 | Frank | | 307/66 |
| 2006/0274468 A1 | 12/2006 | Phadke | | |
| 2008/0315783 A1* | 12/2008 | Inaba | | 315/247 |
| 2008/0316779 A1* | 12/2008 | Jayaraman et al. | | 363/74 |
| 2009/0027931 A1* | 1/2009 | Usui | | 363/84 |
| 2010/0156509 A1* | 6/2010 | Ryu et al. | | 327/520 |

FOREIGN PATENT DOCUMENTS

| | | |
|---|---|---|
| CN | 101355311 | 1/2009 |
| TW | 525337 B | 3/2003 |

OTHER PUBLICATIONS

Laurence McGarry, The Standby Power Challenge, Astec Custom Power (HK) Ltd, A Division of Emerson Network Power, 17lh Floor Lu Plaza, 2 Wing Yip Street,Kwun Tong, Kowloon, Hong Kong, pp. 56-62.

* cited by examiner

SWITCHING POWER SUPPLY FOR A LOAD IN STANBY MODE

FIELD OF THE INVENTION

This invention relates generally to switching electric power supplies and to systems that use them.

BACKGROUND

An electric power supply is a device or system that is capable of providing electrical energy to a load—typically by converting electrical energy from one form to another to make the energy compatible with the load's requirements. For example, an electric power supply might convert 120 or 240 volt alternating current ("AC") energy to lower-voltage, regulated direct current ("DC") energy appropriate for use by an electronic device such as a computer system. Sometimes power supplies are integrated with the devices for which they supply energy. In other applications, power supplies are discrete components and can be internal or external to the load.

Switching electric power supplies (also known variously as switch-mode power supplies, switched-mode power supplies and other similar terms) are those that make use of active switching circuitry along with inductive elements to accomplish the energy conversion task with a minimum of energy loss. In switching power supplies that take their input from AC mains, a common configuration is to employ rectification circuitry and bulk capacitors to create a DC supply from the available AC input. This DC supply is then provided to one or more switching DC-DC output conversion circuits that generate desired DC output levels. Many well-known circuit topologies exist that achieve switching DC-DC conversion. Among them are boost converters, which accomplish DC-DC conversion with a resultant increase in the DC voltage level; buck converters, which accomplish DC-DC conversion with a resultant decrease in DC voltage level; and so-called boost-buck converters, which can produce an increased or a decreased voltage level in DC-DC-conversion.

Power factor is a concept that describes the effectiveness of a load at converting supplied volt-amperes to watts. It is generally defined as the ratio of real power ($I^2R$ or watts) to apparent power ($I^2Z$ or volt-amperes). For many types of loads, this ratio is less than unity. In particular, rectification circuitry in an electric power supply can cause the power supply to appear as a load that has a less-than-unity power factor. Because loads with low power factor are undesirable for a variety of reasons, and because some utilities and government agencies mandate that loads must exhibit prescribed minimum power factors under certain conditions, power factor correction techniques are normally employed. For switching power supplies, power factor correction is usually accomplished with an input DC-DC converter. An input DC-DC converter is a switching converter placed between the rectification circuitry and the bulk capacitors that feed the output converters. The switching element of the input DC-DC converter is controlled in an effort to shape the input current of the power supply so that it matches the voltage waveform of the AC mains, resulting in improved power factor for the power supply and reduced harmonics in the current waveform.

DETAILED DESCRIPTION OF THE PREFERRED EMBODIMENTS

The inventors hereof have determined that active power factor correction circuitry in switching power supplies draws a fairly constant and not-insignificant amount of power, and that this power draw may not be necessary under all modes of operation of the switching power supply. For example, although government regulations exist in some jurisdictions mandating that loads exhibit a certain minimum power factor, such regulations typically apply only above some minimum power draw threshold. For operating points below the minimum power draw threshold, the power factor of the load need not meet the specified standard. Accordingly, the inventors hereof have devised switching power supply systems that can disable power factor correction circuitry at these operating points, thereby saving power draw that is wasted in prior art systems.

Figure 1:
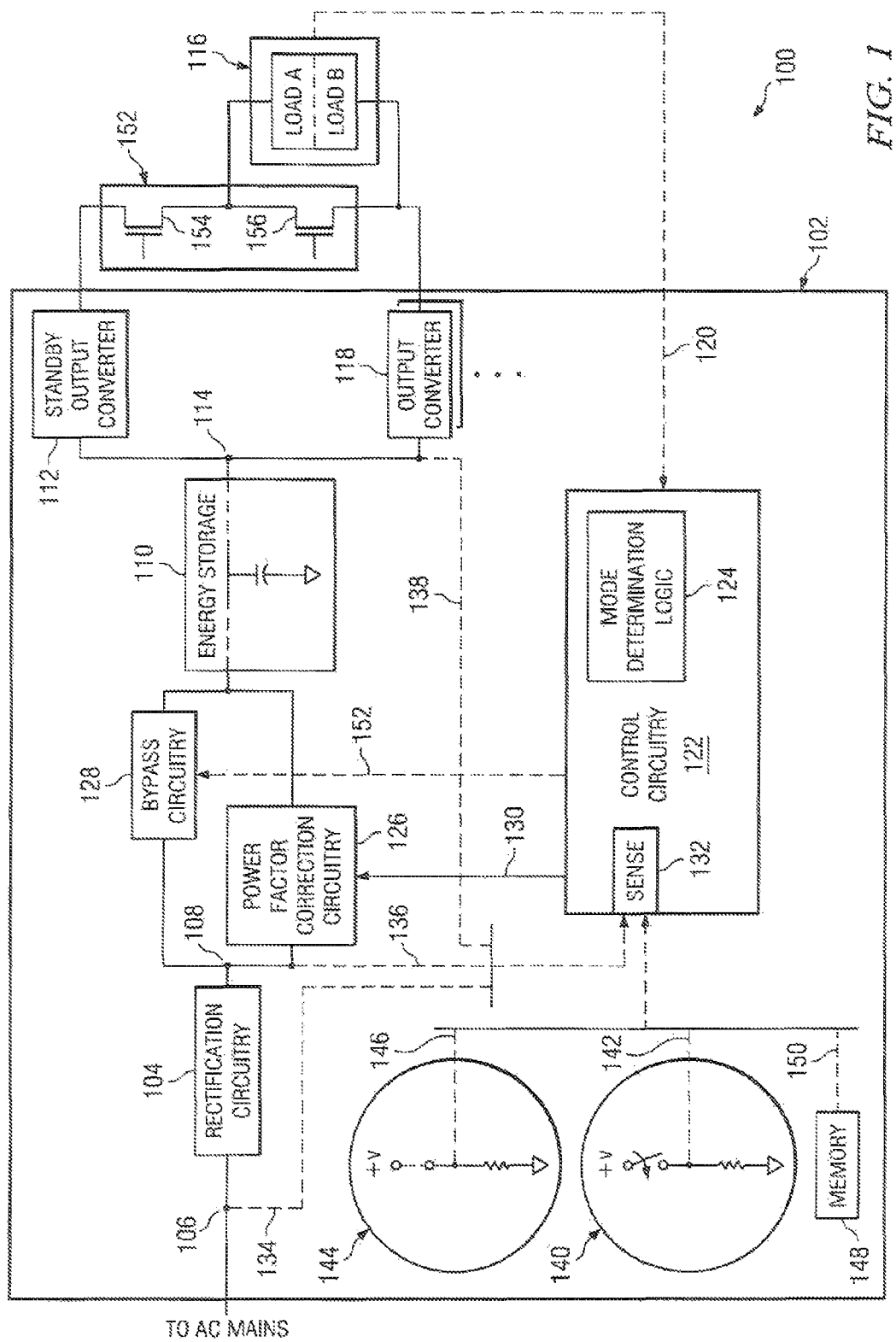
FIG. 1 is a block diagram illustrating a variety of systems according to preferred embodiments of the invention.

FIG. 1 illustrates a variety of systems 100 according to preferred embodiments of the invention. A switching power supply 102 includes rectification circuitry 104. Rectification circuitry 104 may be coupled to AC mains at an AC input 106 and creates a varying DC level at node 108. Rectification circuitry 104 may take any conventional form such as a full-wave or half-wave rectifier. Energy storage element 110 will typically take the form of a bulk capacitor, although alternative or additional energy storage elements (such as a battery, for example) may be used.

Load 116 may represent a single load. Load 116 may also represent multiple separate loads indicated in the figure as loads A and B. Load 116 may be capable of operating in a standby mode wherein the load requires a non-zero amount of power, or in an alternate mode that requires more power than does the standby mode. In the multiple load case, loads A and B may be active independently. For example, load A may be active in one state of the system, while load B may be active in another state of the system. In yet another state of the system, loads A and B may be active simultaneously.

Standby output converter 112 has an input 114 connected to energy storage element 110. Output converter 112 is capable of supplying the power needs of load 116 when load 116 is in the standby mode or when load A is active but load B is not active. One or more additional output converters 118 may be provided, also having an input 114 connected to energy storage element 110. Output converter 118 is capable of supplying the power needs of load 116 when load 116 is in the alternate mode or when load B is active.

By way of example, in one embodiment, load 116 may include a computing device. The computing device may be capable of operating in a standby mode wherein its CPU and other main components are not functioning, but wherein wake-on-LAN circuitry is enabled. In such a mode, the power requirements of the computing device are very low and may be satisfied by a relatively low-capacity standby output converter 112. But when the computing device receives a command via its wake-on-LAN circuitry to turn on and boot up, then it will transition to an alternate mode wherein its CPU and other main components may be operational. In this alternate mode, the computing device may require more power than in the standby mode, warranting activation of one or more higher-capacity output converters 118. The wake-on-LAN and other standby circuitry in the computing device may be configured as a load A, and the CPU and other main components may be configured as a separate load B. In such a case, loads A and B need not be designed to operate at the same supply potential. Alternatively, they may be configured as a single load or as two loads operating at a single supply potential.

In some embodiments, switching circuitry 152 may be added to provide flexibility in the way output converters 112 and 118 are coupled to load 116. Switching circuitry 152 may include numerous switching elements such as FETs 154 and 156, which may be controlled by control circuitry 122 or other control circuitry. If loads A and B are both designed to operate at the same supply potential, then output converter 118 may drive both loads A and B by turning switch 156 on and switch 154 off; and output converter 112 may drive load A by itself (for example, when load 116 is in standby mode) when switch 154 is turned on and switch 156 is turned off. It would also be possible in such a design to have both converters active simultaneously if both switches 154 and 156 are turned on. If loads A and B are designed to operate at different supply potentials, then switching circuitry 152 may be eliminated, output converter 112 may be directly connected to load A, and output converter 118 may be directly connected to load B.

One way of detecting when load 116 has transitioned from its standby mode to an alternate mode is via a control signal 120 coupled from load 116 to control circuitry 122 in power supply 102. Another way of doing so is for power supply 102 to sense, by any conventional method, an increase in power being required by load 116. Mode determination logic 124 in control circuitry 122 may be configured to operate according to either of these schemes or an equivalent alternate scheme. Standby output converter 112 and output converter(s) 118 will typically take the form of switching DC-DC converters and may be controlled in a conventional manner.

Power factor correction circuitry 126 is connected between rectification circuitry 104 at node 108 and energy storage element 110 as shown. Power factor correction circuitry 126 may be any kind of active power factor correction system and will typically take the form of a boost, buck, boost-buck or other well-known DC-DC converter. Bypass circuitry 128 is connected in parallel with power factor correction circuitry 126, also as shown. Control circuitry 122 is capable of enabling or disabling power factor correction circuitry 126 by means of a control signal 130. When power factor correction circuitry 126 is operational, bypass circuitry 128 may be disabled such that the DC voltage level at node 114 is driven by the output of power factor correction circuitry 126. But when power factor correction circuitry 126 is disabled, bypass circuitry 128 may be enabled such that the DC voltage level at node 114 is driven by the output of rectification circuitry 104. (In the latter mode of operation, the output of rectification circuitry 104 is effectively communicated to node 114 via bypass circuitry 128.)

Standby output converter 112 will typically only be able to operate when the DC voltage level at its input 114 is within a tolerated range. For example, in an embodiment, converter 112 might be capable of operating correctly when the voltage level at input 114 is between 200 VDC to 400 VDC. In such an embodiment, if the rectified voltage level at node 108 (or node 114 when bypass circuitry 128 is enabled) is within that range, then it should be possible to power converter 112 with power factor correction circuitry 126 disabled when load 116 is in standby mode or when only load A is active. But if the rectified voltage level at node 108 (or node 114 when bypass circuitry 128 is enabled) is not within that range, then powering converter 112 without power factor correction circuitry 126 should not be attempted.

Figure 2:
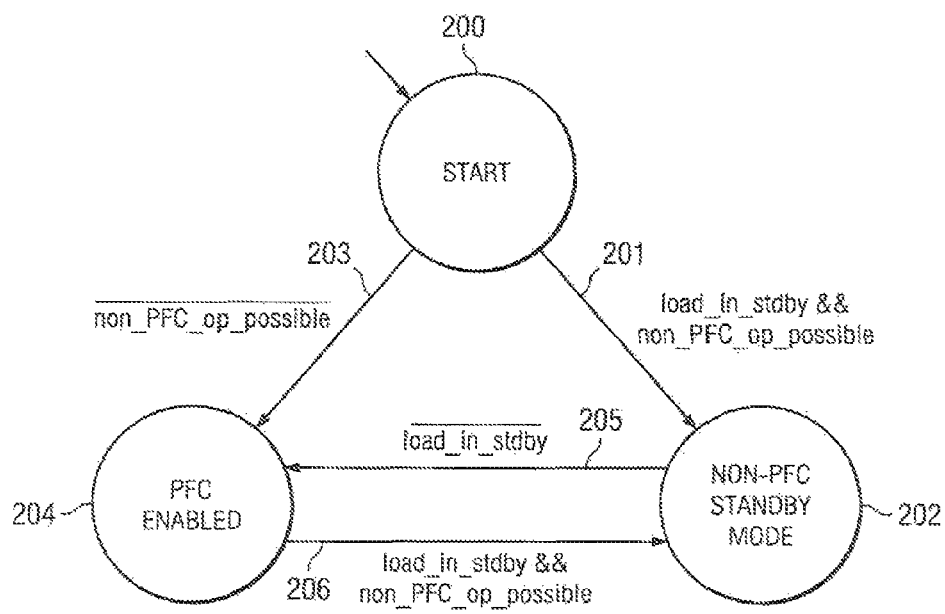
FIG. 2 is a state diagram illustrating behavior of the switching power supply systems of FIG. 1 according to preferred embodiments of the invention.

The state diagram of FIG. 2 captures this behavior. From start state 200, it may be determined whether load 116 is in standby mode or whether only load A is active (load_in_stdby). It also may be determined whether it is possible to operate standby output converter 112 with power factor correction circuitry 126 disabled (non_PFC_op_possible). In such an embodiment, if both conditions are true (arc 201), then the next state is state 202. In state 202, power factor correction circuitry 126 is disabled and bypass circuitry 128 is made functional. Otherwise, arc 203 is followed and the next state is state 204, wherein power factor correction circuitry 126 is enabled and bypass circuitry 128 is not functional. Power supply 102 can transition between states 202 and 204 during operation. For example, it can transition from state 202 to state 204 when load 116 transitions from standby mode to an alternate mode requiring more power (or a mode in which load B is activated), as shown at arc 205. And power supply 102 can transition from state 204 to state 202 when load 116 re-enters the standby mode (or a mode in which load B is deactivated) and it is possible to operate standby output converter 112 with power factor correction circuitry 126 disabled, as shown at arc 206.

A variety of techniques may be used to determine whether it is possible to operate standby output converter 112 (and thus to drive load 116 in standby mode) with power factor correction circuitry 126 disabled. Any means will suffice that indicates, directly or indirectly, whether the voltage level at node 114 is or would be within the input range tolerated by standby output converter 112 when power factor correction circuitry 126 is disabled, and when bypass circuitry 128 is functional. One class of embodiments that achieves this is to provide control circuitry 122 with a voltage sense input 132. In one set of implementations, voltage sense input 132 may be coupled to an analog voltage level at any appropriate node within power supply 102 including, for example: AC input 106 to rectification circuitry 104 as shown at 132, output 108 of rectification circuitry 104 as shown at 136, or input 114 of standby output converter 112 as shown at 138. In another set of implementations, voltage sense input 132 may be coupled to a binary level that has been set to indicate whether operation without power factor correction circuitry 126 is possible. Such a binary level may be provided, for example, by connecting sense input 132 to a control switch circuit 140 as shown at 142, to a control jumper circuit 144 as shown at 146, or to a memory device or element 148 as shown at 150. Control switch circuit 140, control jumper circuit 144 and/or memory element 148 can be located anywhere in system 100 and need not be located in power supply 102.

Figure 3:
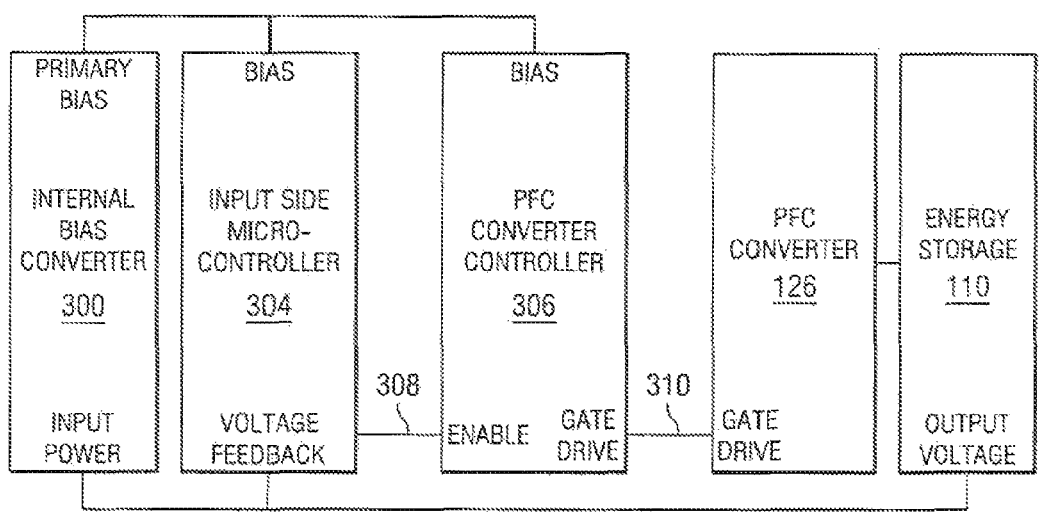
FIG. 3 is a block diagram illustrating several possible implementations of certain control elements in a switching power supply according to FIG. 1.

FIG. 3 illustrates one of many possible implementations for control elements within power supply 102. In the implementation shown, an internal bias converter 300 is powered by an output voltage 302 taken from energy storage element 110. (Output voltage 302 may be the same as or different than the voltage on node 114, depending on the design.) Internal bias converter 300, in turn, powers an input side microcontroller 304 and power factor correction ("PFC") converter controller 306. In embodiments such as this, control signal 130 can take the form of an enable signal 308 from controller 304 to controller 306, or it can take the form of a gate drive signal 310 from controller 306 to PFC converter 126. Other embodiments are also possible.

Figure 4:
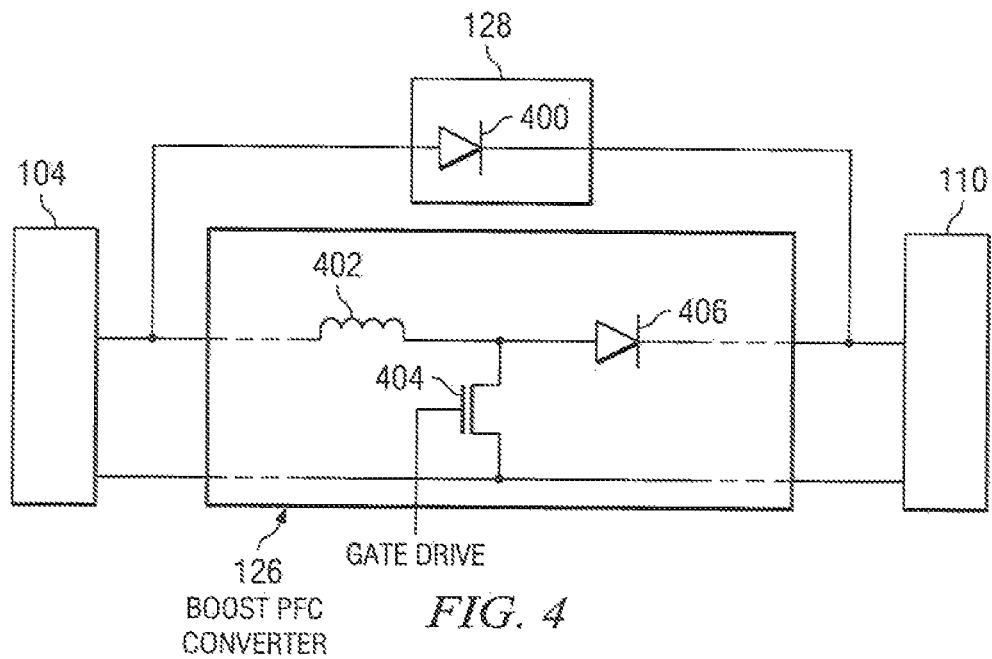
FIG. 4 is a schematic diagram illustrating one possible class of implementations of the power factor correction and bypass circuitry in a switching power supply according to FIG. 1.
Figure 5:
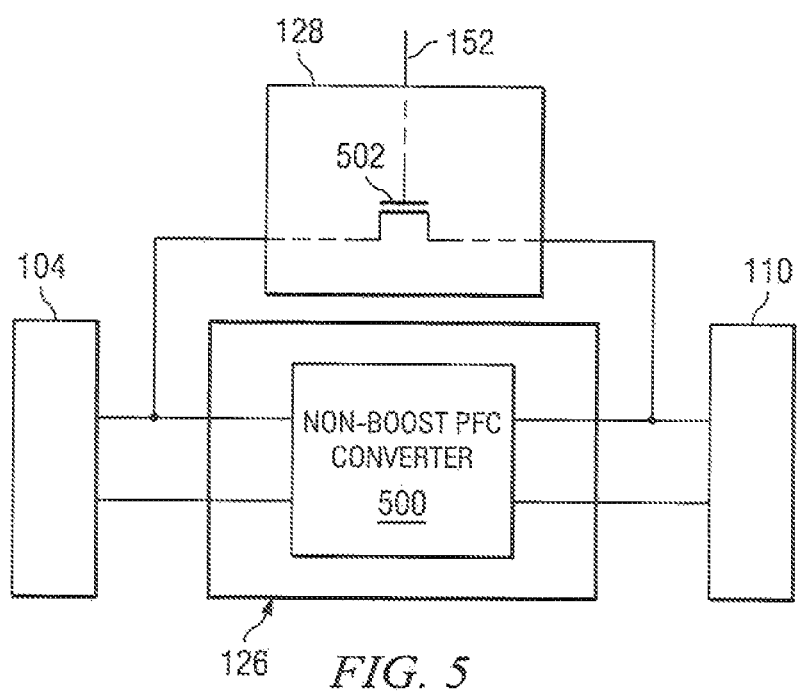
FIG. 5 is a schematic diagram illustrating another possible class of implementations of the power factor correction and bypass circuitry in a switching power supply according to FIG. 1.

Power factor correction circuitry 126 and bypass circuitry 128 can take a variety of forms. FIG. 4 illustrates one possible class of embodiments in which power factor correction circuitry 126 comprises a boost converter. In such embodiments, bypass circuitry 128 may consist of a simple bypass diode 400. The boost converter in such embodiments will typically include a boost inductor 402, a diode 406 and a switching element 404 such as a field effect transistor ("FET") as shown. FIG. 5 illustrates another class of embodiments in which power factor correction circuitry 126 is not a boost converter, but may instead comprise a buck converter, a boost-buck converter or some other switching DC-DC conversion topology 500. In those embodiments, bypass circuitry 128 may be implemented more generally to comprise a switching element 502 such as a FET as shown. Switching element 502 should preferably be controlled (see, for example, control signal 152) such that it communicates the DC level from rectification circuitry 104 to storage element 110 when power factor correction circuitry 126 is disabled, and turns off when power factor correction circuitry 126 is enabled.

While the invention has been described in detail with reference to preferred embodiments thereof, the described embodiments have been presented by way of example and not by way of limitation. It will be understood by those skilled in the art and having reference to this specification that various changes may be made in the form and details of the described embodiments without deviating from the spirit and scope of the invention as defined by the appended claims.

In the appended claims and in the foregoing written description, the words "comprising" and "comprises" are to be read in the open sense to mean "including the following elements but not excluding others."

What is claimed is:

1. A switching power supply, comprising: first and second output converters, each having an input connected to an energy storage element; power factor correction circuitry connected between rectification circuitry and the energy storage element; bypass circuitry connected both to the energy storage element and in parallel with the power factor correction circuitry, wherein the bypass circuitry comprises a switch operated by control circuitry; and control circuitry configured to: disable the power factor correction circuitry and enable the bypass circuitry by the switch when the first output converter is active and the second output converter is not active; enable the power factor correction circuitry and disable the bypass circuitry by the switch when the second output converter is active; and wherein the control circuitry comprises a sense input configured to sense a voltage at an input of the first output converter, at an output of the rectification circuitry, a binary level sensed voltage, and at an AC input of the rectification circuitry indicating whether to operate the first output converter while the power factor correction circuitry is disabled based on the binary level sensed voltage being within a tolerated input voltage range of the first output converter, and wherein the binary level sensed voltage is taken from a control jumper circuit.

2. The switching power supply of claim 1, wherein: the control circuitry is configured not to disable the power factor correction circuitry when the sensed voltage indicates that such operation is not possible.

3. The switching power supply of claim 1, wherein: the sensed voltage indicates whether a DC level at the input of the first output converter, created by the rectification circuitry and communicated thereto via at least the bypass circuitry, is within a range of input levels tolerated by the input of the first output converter.

4. The switching power supply of claim 1, wherein: the power factor correction circuitry comprises a boost converter and the bypass circuitry is a diode.

5. The switching power supply of claim 1, wherein: the power factor correction circuitry is not a boost converter.

6. A method of operating a switching power supply, comprising: determining whether a load of the power supply is in a standby mode by: sensing a voltage at an input of a standby output converter, at an output of rectification circuitry, and at an AC input of the rectification circuitry via control circuitry, wherein a binary level sensed voltage is taken from a control jumper circuit coupled to a sense input, wherein the standby output converter and a second output converter each have an input connected to an energy storage element; determining whether the standby output converter is active by the binary level sensed voltage being within a tolerated input voltage range of the standby output converter; and disabling power factor correction circuitry and enabling bypass circuitry via a switch controlled by the control circuitry in the power supply if it is determined that the load is in the standby mode, wherein the power factor correction circuitry is connected between the rectification circuitry and the energy storage element and wherein the bypass circuitry is connected both to the energy storage element and in parallel with the power factor correction circuitry; else enabling the power factor correction circuitry and disabling the bypass circuitry via the switch controlled by the control circuitry, wherein the bypass circuitry and the power factor correction circuitry are connected to a shared capacitor.

7. The method of claim 6, further comprising: not disabling the power factor correction circuitry if it is determined that it is not possible for the power supply to drive the load with the power factor correction circuitry disabled while the load is in the standby mode.

8. The method of claim 6, wherein: determining whether the load is in the standby mode includes determining whether the load is in an alternate mode requiring more power than the standby mode.

9. The method of claim 6, wherein: the load comprises first and second loads; the standby mode corresponds to a state in which the first load is active and the second load is not active; and the determining step comprises determining whether the second load is or is about to become active.

10. A system, comprising: a switching power supply having power factor correction circuitry and a standby output converter, wherein the standby output converter and a second output converter each have an input connected to a shared energy storage element; a load coupled to an output of the switching power supply; the shared energy storage element coupled to the power factor correction circuitry and a bypass circuitry, wherein the bypass circuitry comprises a switch operated by control circuitry, wherein the power factor correction circuitry is connected between a rectification circuitry and the shared energy storage element and wherein the bypass circuitry is connected in parallel with the power factor correction circuitry; wherein the switching power supply includes control circuitry configured to: disable the power factor correction circuitry and enable the bypass circuitry by the switch when the load is in a standby mode powered by the standby output converter when a sensed voltage of the load at an input of the standby output converter, at an output of rectification circuitry, a binary level sensed voltage, and at an AC input of the rectification circuitry is within an input voltage range of the standby output converter; enable the power factor correction circuitry and disable the bypass circuitry by the switch when the load is in an alternate mode requiring more power than the standby mode; and mode determination logic in the control circuitry of the power supply configured to determine, responsive to a sensed level of power demanded by the load whether the load is in the standby or the alternate mode, wherein the sensed level of power demand is the binary level sensed voltage taken from a control jumper circuit.

11. The system of claim 10, wherein:
the load comprises a computing device.

12. The system of claim 10, wherein:
the load comprises first and second loads;
the standby mode corresponds to a state in which the first load is active and the second load is not active; and
the alternate mode corresponds to a state in which the second load is active.

\* \* \* \* \*